(12) United States Patent
Wroblewski

(10) Patent No.: US 10,650,012 B1
(45) Date of Patent: May 12, 2020

(54) MULTI-DIMENSIONAL RANGE-INDEX SEARCHING USING SEARCH BOX APPROXIMATION AND SPLITTING

(71) Applicant: THE UNITED STATES OF AMERICA AS REPRESENTED BY THE SECRETARY OF THE NAVY, San Diego, CA (US)

(72) Inventor: Ronald J. Wroblewski, San Diego, CA (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 784 days.

(21) Appl. No.: 15/379,998

(22) Filed: Dec. 15, 2016

Related U.S. Application Data

(60) Provisional application No. 62/361,985, filed on Jul. 13, 2016.

(51) Int. Cl.
    *G06F 16/248* (2019.01)
    *G06F 16/22* (2019.01)
    *G06F 16/28* (2019.01)
    *G06F 16/2458* (2019.01)

(52) U.S. Cl.
    CPC ............ *G06F 16/248* (2019.01); *G06F 16/22* (2019.01); *G06F 16/2462* (2019.01); *G06F 16/283* (2019.01)

(58) Field of Classification Search
    CPC ...... G06F 16/248; G06F 16/22; G06F 16/283; G06F 16/2462
    See application file for complete search history.

(56) References Cited

U.S. PATENT DOCUMENTS 5,963,956 A * 10/1999 Smartt ................ G06F 16/2264
6,021,406 A *  2/2000 Kuznetsov .......... G06F 16/5854
(Continued)

OTHER PUBLICATIONS

Fox, A., C. Eichelberger, J. Hughes, & S. Lyon, "Spatio-temporal Indexing in Non-relational Distributed Databases", ISBN 9781479912933, 2013 IEEE.
(Continued)

*Primary Examiner* — Kris E Mackes
*Assistant Examiner* — Tiffany Thuy Bui
(74) *Attorney, Agent, or Firm* — Naval Information Warfare Center, Pacific; Kyle Eppele; Ryan J. Friedl

(57) ABSTRACT

A method involves receiving, from a user, a user query for data contained within a multi-dimensional dataset comprising a plurality of data objects, generating a multi-dimensional search box for use in searching the multi-dimensional dataset according to the user query, wherein the size of the multi-dimensional search box is approximated based upon a percentage of the scale of the dataset and upon the standard deviation of the data object distribution of the dataset, searching the multi-dimensional dataset using the multi-dimensional search box, and returning, to the user, data from the multi-dimensional dataset contained within the multi-dimensional search box. The multi-dimensional search box may be generated in part by modeling the range of values as an arbitrary start point within the multi-dimensional data set with extents that are Gaussian distributed with a standard deviation less than the scale of the data set.

2 Claims, 9 Drawing Sheets

(56) References Cited

U.S. PATENT DOCUMENTS

| | | | | |
|---|---|---|---|---|
| 6,636,847 | B1* | 10/2003 | Spires | G06F 16/29 |
| | | | | 707/770 |
| 6,859,455 | B1* | 2/2005 | Yazdani | H04L 45/00 |
| | | | | 370/392 |
| 7,117,217 | B2* | 10/2006 | Ooi | G06F 16/283 |
| 7,167,856 | B2 | 1/2007 | Lawder | |
| 7,325,001 | B2* | 1/2008 | Goldstein | G06F 16/2264 |
| 7,400,784 | B2* | 7/2008 | Joly | G06K 9/00711 |
| | | | | 382/305 |
| 7,567,972 | B2* | 7/2009 | Geiselhart | G06F 16/30 |
| 8,055,687 | B2 | 11/2011 | Zhang et al. | |
| 2003/0212650 | A1* | 11/2003 | Adler | G06F 16/5854 |
| 2010/0082654 | A1* | 4/2010 | Zhang | G06F 16/283 |
| | | | | 707/759 |
| 2016/0342733 | A1* | 11/2016 | Reid | G16B 20/00 |
| 2017/0017715 | A1* | 1/2017 | Wroblewski | G06F 16/283 |
| 2017/0255682 | A1* | 9/2017 | Pounds | G06F 16/2228 |

OTHER PUBLICATIONS

Lawder, J. K. and P. J. H. King, Using Space-Filling Curves for Multi-Dimensional Indexing. In: Lings, B. and K. Jeffrey (eds,), Proceedings of the 17th British National Conference on Databases (BNCOD 17), vol, 1832, ser. Lecture Notes in Computer Science, pp. 20-35, Springer Verlag, Jul. 2000.

Floreza, O.U., X. Qia, & A. Ocsab, "MOBHRG: Fast K-Nearest-Neighbor Search by Overlap Reduction of Hyperspherical Regions," ICASSP 2009, IEEE.

Hoelt, E.G., "A Qualitative Comparison Study of Data Structures for Large Line Segment Databases," 1992 ACM SIGMOD.

Orenstein, J., "A Comparison of Spatial Query Processing Techniques for Native and Parameter Spaces," 1990 ACM.

Keller, O., T. Kopeiowitz, M. Leweristein, "Range Non-overlapping Indexing and Successive List Indexing," Algorithms and Data Structures, 10th International Workshop, WADS 2007: 625-636, 2007.

T. Sellis, N. Roussopoulos, & C. Faloutsos, "The R+-Tree: a dynamic index for multi-dimensional objects," In Proc. 13th International Conference on VLDB, pp. 507-518, England, Sep. 1987.

Agarwala P.K. & J. Erickson, Geometric Range Searching and Its Relatives, Contemporary Mathematics, 2004.

Liao, H., J. Han, & J. Fang, "Multi-dimensional Index on Hadoop Distributed File System," 2010 Fifth IEEE International Conference on Networking, Architecture, and Storage.

Francis, F. S. & P. Xavier, "Amendments to the R*-Tree Construction Principles in Distributed Environment," Int'l. Jour. of Engin. & Tech., ISSN: 2278-0181, vol. 3, Iss. 5, May 2014.

Morton, G, "A Computer-Oriented Geodetic Data Base and a New Technique in File Sequencing," Tech Report, IBM Ltd., Ottawa, Canada, 1966.

Asano, T., T, Roos, P. Widmayer, & E. Welzl, "Space-Filling Curves and Their Use in the Design of Geometric Data Structures," Proc. 2nd Latin Amer.Sympos. Theoret. Infomatics, Lecture Notes Comput. Sci., vol. 911, Springer-Verlag, 1995, pp. 36-48.

Lawder, J. K., The Application of Space-Filling Curves to the Storage and Retrieval of Multi-Dimensional Data, Ph.D. thesis, School of Computer Science and Information Systems, Birkbeck College, University of London, 2000, available at http://www.dcs.bbk.ac.uk/~jkl/thesis.pdf.

* cited by examiner

MULTI-DIMENSIONAL RANGE-INDEX SEARCHING USING SEARCH BOX APPROXIMATION AND SPLITTING

CROSS-REFERENCE TO RELATED APPLICATIONS

This application claims the benefit of U.S. Provisional Patent Application Ser. No. 62/361,985 filed Jul. 13, 2016, entitled "Method for Approximate, Multi-Dimensional Range-Index Searching for Big Data", the content of both of which being fully incorporated by reference herein.

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil; reference Navy Case Number 103673.

BACKGROUND

A common data-processing problem is the retrieval or counting of objects in a data store whose extent includes a given point or extent. The extents can be one-dimensional, such as temporal durations, or higher-dimensional, such as areas, volumes, etc. The problem is an old one and has been approached in many ways: bounding lists, multi-dimensional indexing, quad-trees, various hierarchical trees such as interval trees and R-trees, and simplex range searching. While the problem has been solved for non-distributed data stores, in the age of big data and distributed stores this is no longer the case. Hierarchical trees are neither well suited for, as an example, key-value databases nor Hadoop disk dumps. A need exists for a method that can improve data search and retrieval for applications such as distributed data stores.

DETAILED DESCRIPTION OF SOME EMBODIMENTS

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

The embodiments disclosed herein relate to a method for multi-dimensional range-index searching using search box approximation and splitting. The embodiments may be used, for example, to search large, multi-dimensional, distributed datasets and provide results to a user.

Figure 1:
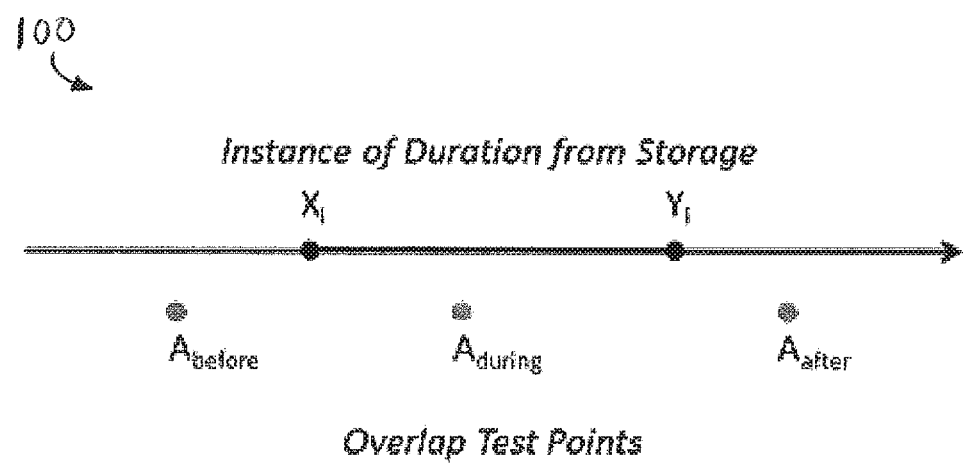
FIG. 1 shows a diagram illustrating overlap of points with a one-dimensional range.

To start, consider the one-dimensional range problem. Assume there is a collection of many ranges, characterized by a start and end point. A test point is given and the task is to find what ranges from the collection overlap this point. There are three cases possible for each range: the point is before, during, or after, as illustrated in diagram 100 shown in FIG. 1.

Figure 2:
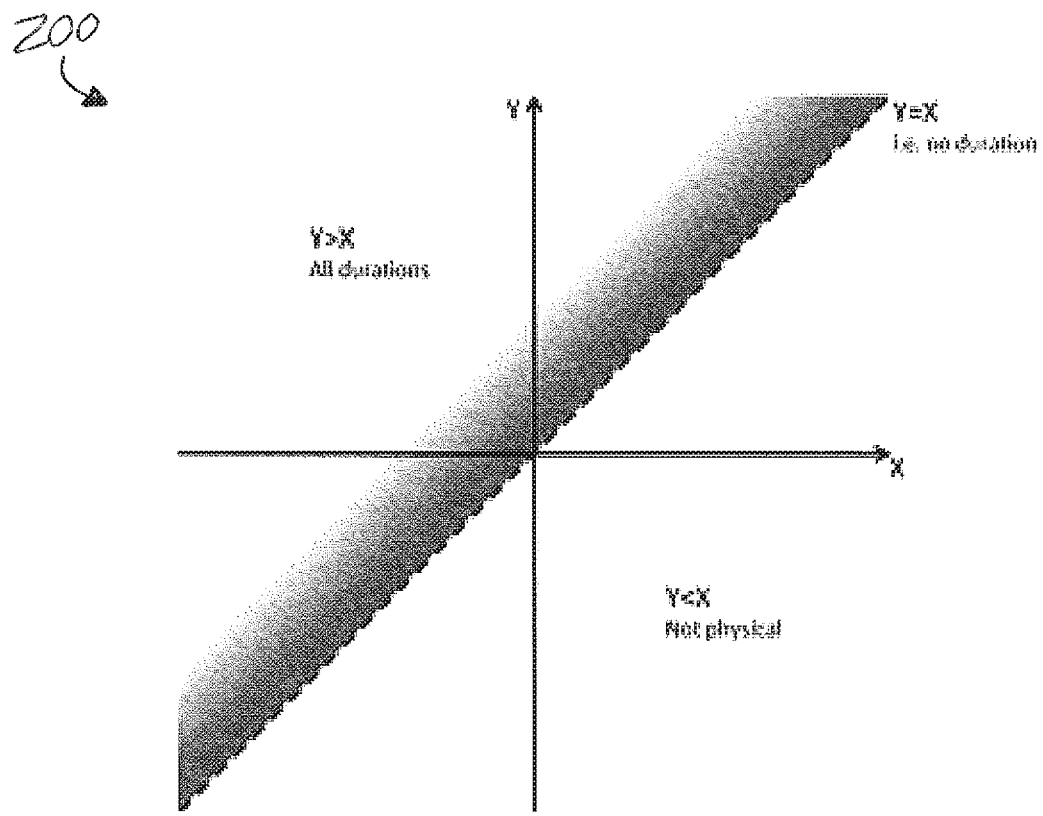
FIG. 2 shows a diagram illustrating one-dimensional ranges plotted in two-dimensional space.

Treating the start (X) and end (Y) points of the ranges as independent variables, the collection of ranges can be plot as a collection of points in a two-dimensional range space. The space divides into two regions with all the physically possible durations existing in one half, with points (zero-duration) existing on the dividing line. This is illustrated in diagram 200 shown in FIG. 2.

Figure 3:
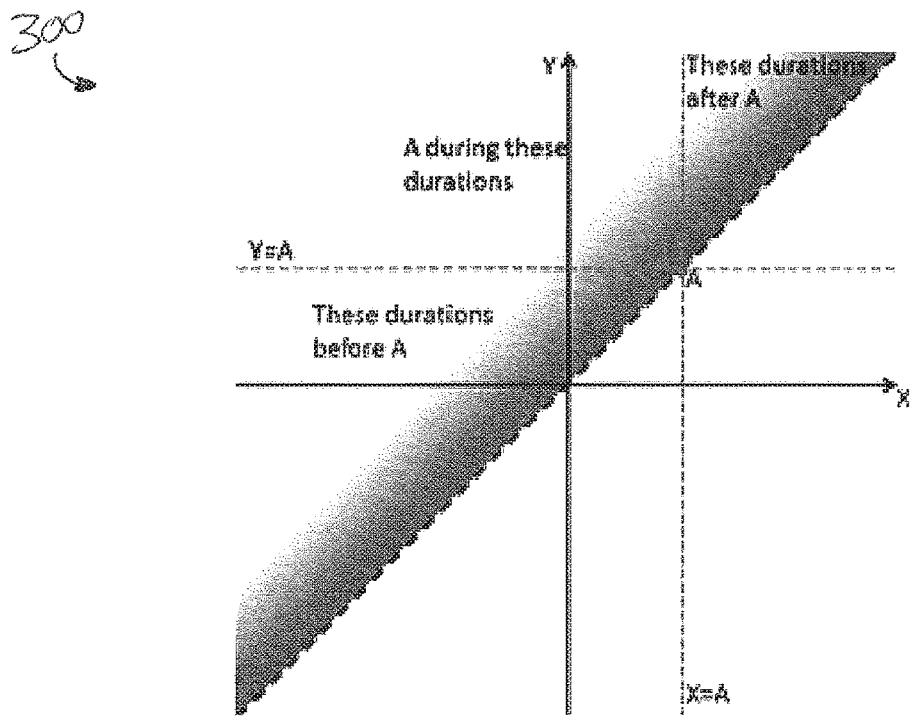
FIG. 3 shows a diagram illustrating the location of overlap regions for points.

The test point A splits the range space into three distinct regions, as shown in diagram 300 shown in FIG. 3, that can be identified as the before, during, and after cases. Hence, an orthogonal search box with limits of [min(X), A] in the lower left to [A, max(Y)] on the upper right will find all durations that include A. Finding the before durations or after durations are simple one-dimensional searches using the upper- and lower-bounding lists.

Extending this to orthogonal searches in higher dimensions is straight forward: areas embed into a four-dimensional space, volumes embed into a six-dimensional space, etc. The search boxes become hypercubes. Combinations of before/during/after regions are all also higher-dimensional and hence are no longer amenable to the simple one-dimensional upper- and lower-bounding lists.

Figure 4:
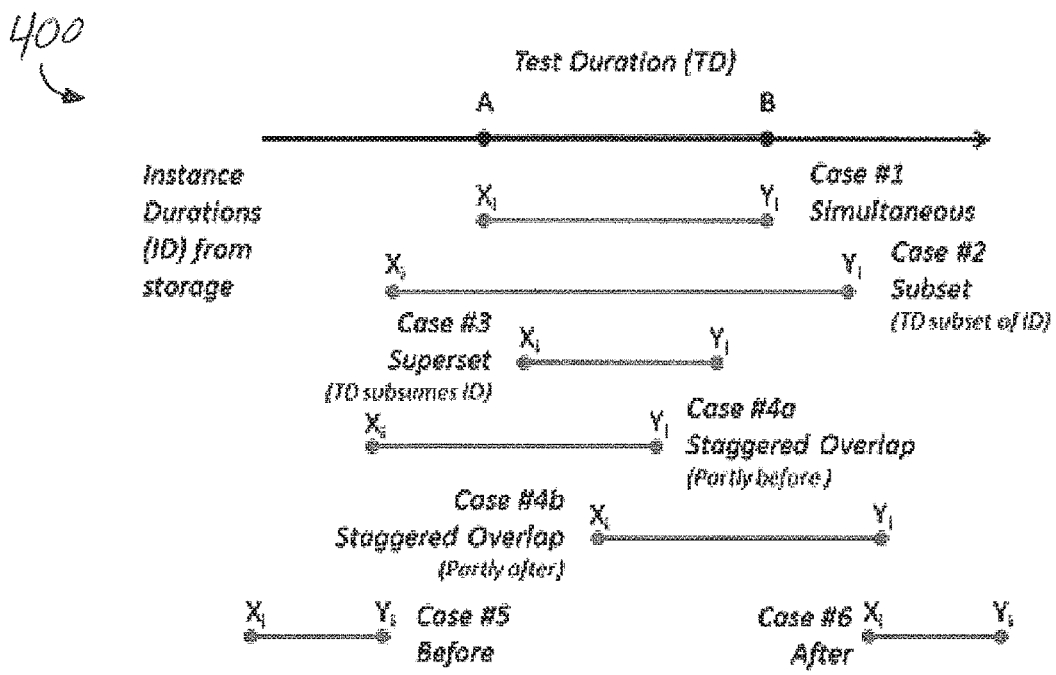
FIG. 4 shows a diagram illustrating overlap of one-dimensional ranges with a one-dimensional range.

The situation becomes more complicated when the test object is also a range. There are now a number of different types of overlaps plus the before and after cases. Diagram 400 shown in FIG. 4 summarizes these for the one-dimensional case. Note that the instances pulled from the data collection are displayed towards the bottom of diagram 400.

Figure 5:
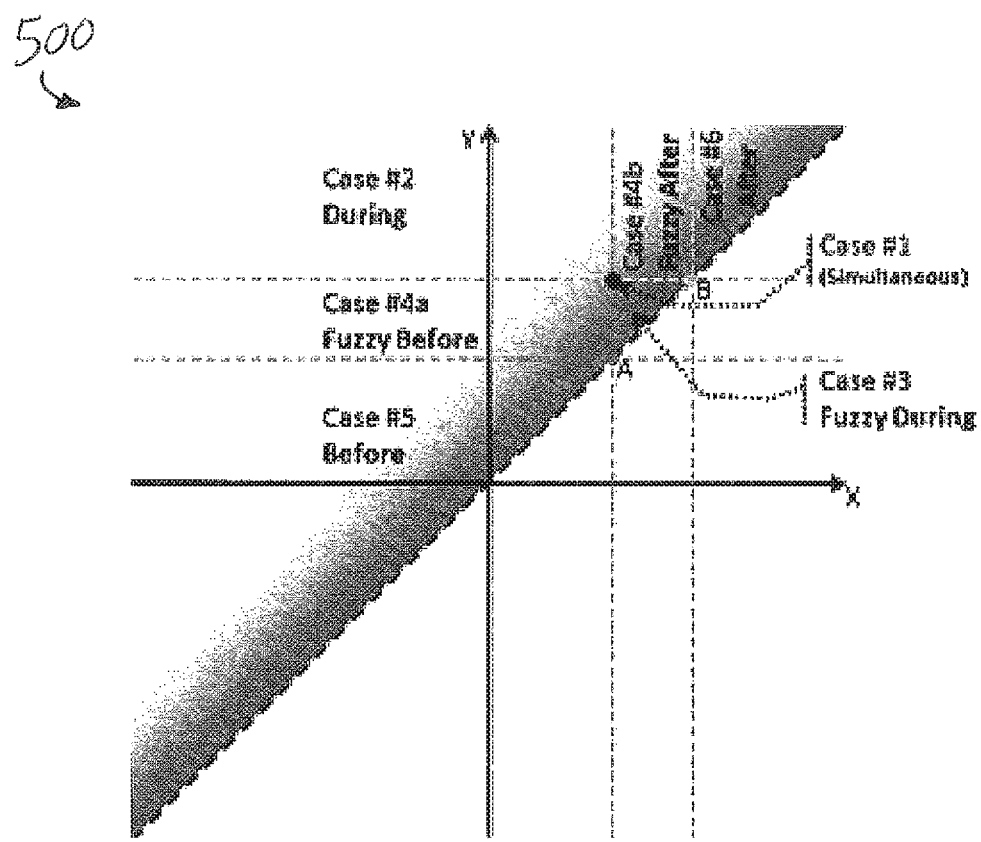
FIG. 5 shows a diagram illustrating the location of one-dimensional range overlaps in two-dimensional space.

Concomitantly, the range space is broken up into more distinct regions, as shown in diagram 500 of FIG. 5. As before, the before durations and after durations can be found directly using upper- and lower-bounding lists for this one-dimensional case. The rest of the regions require search boxes. The interesting search case is to determine if there are any overlaps. For a test interval [A, B], the search box has a lower-left corner of [min(X), A] and an upper-right corner of [B, max(Y)]. The reflection point of the test interval, [B, A], is the lower-right corner. Also as before, this can be generalized to extents of higher dimension with complexity increasing combinatorially.

One method of searching these range-space boxes is via multi-dimensional indexing (MDI) based on space-filling curves, which is currently being successfully used, for example, as the key in NoSQL databases. Space-filling curves have the property of linearly ordering multi-dimensional data such that points near one another in the multi-dimensional space are near in the linear ordering, on average. The key phrase is 'on average', which for Morton, Hilbert, or Gray-Code types means within cascading powers of two in each dimension. As an example, the embodiments are discussed with reference to the Morton, or Z-order, index, which involves interleaving the bits of the binary representations of the dimensions and is computationally trivial to extend to higher dimensions. However, other space-filling curve indexing methods may be used as would be recognized by one having ordinary skill in the art.

To search using MDI the indexes are computed for the two points with all the lowest ranges and the highest ranges. This gives you the search limits in the linear index space. The issue with this search is that the index run between the limits can make large excursions outside of the desired search box. This is particularly exacerbated with higher dimensionality and is caused by the search box crossing bit boundaries, sometimes called fault lines. These excursions can be reduced significantly by splitting the search box.

Figure 6A:
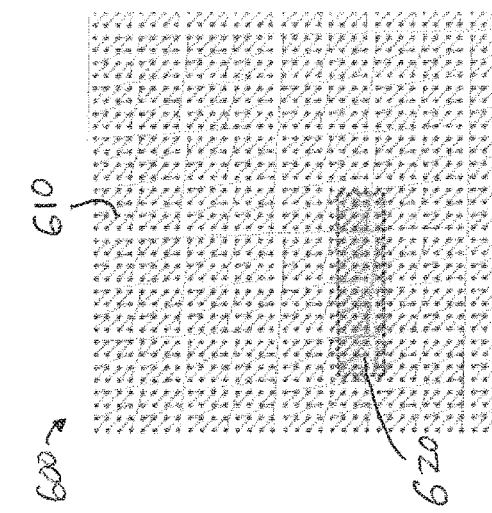
FIGS. 6A-6F show diagrams illustrating successive search-box splitting along longest bit boundaries.
Figure 6B:
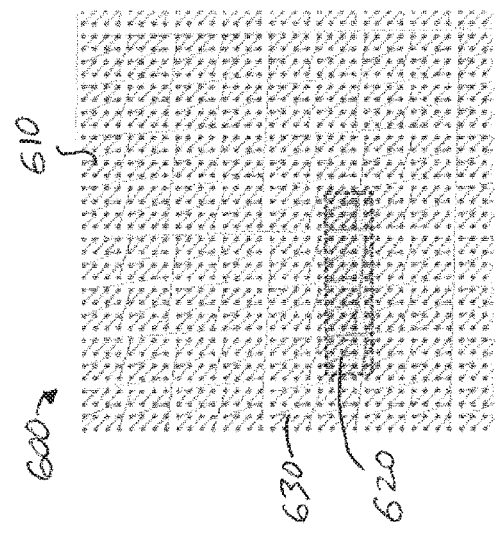
Figure 6C:
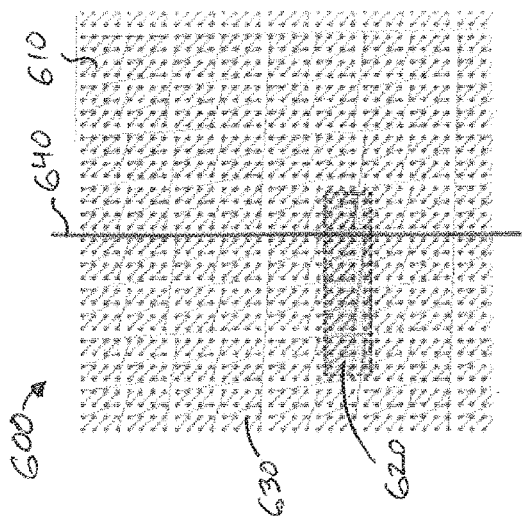
Figure 6D:
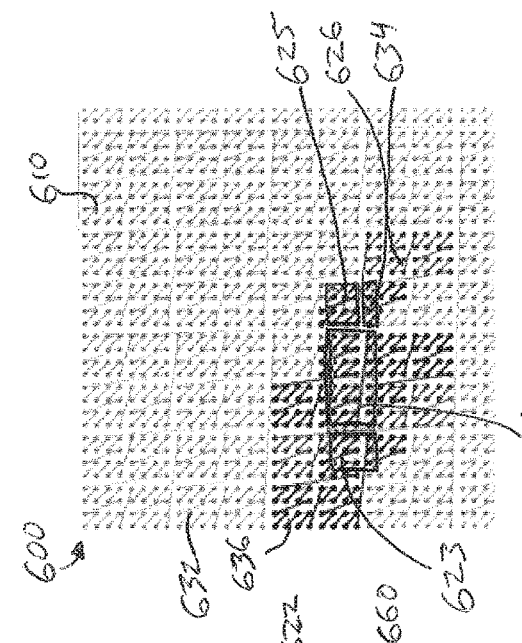

The search box is split along the largest bit boundary, which is found by determining the largest bit of the XOR of the start and end indexes of the box. Diagram 600 shown in FIGS. 6A-6F illustrates this process. FIG. 6A shows a Morton-indexing grid 610 having a sample search box 620 overlaid thereon. FIG. 6B highlights the run of the search indexes 630 that cover search box 620, highlighted in a light-shaded overlay. Computing the largest bit boundary crossing the box, FIG. 6C gives the split, shown by line 640. FIG. 6D illustrates the reduced index runs of the split search box, which is split by line 640 into separate boxes 621 and 622, with the runs 634 highlighted in a medium-shaded overlay.

Figure 6E:
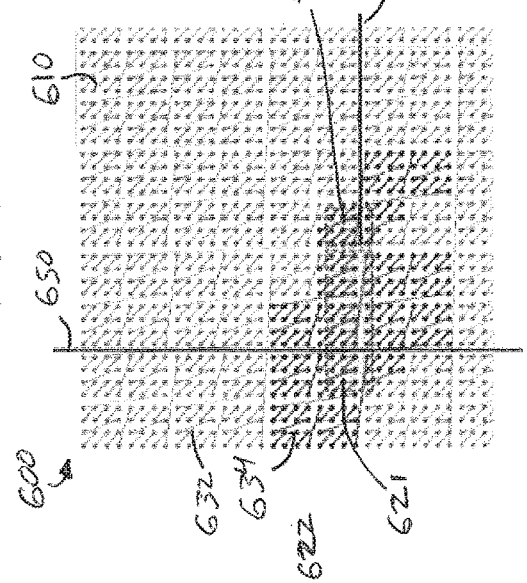
Figure 6F:
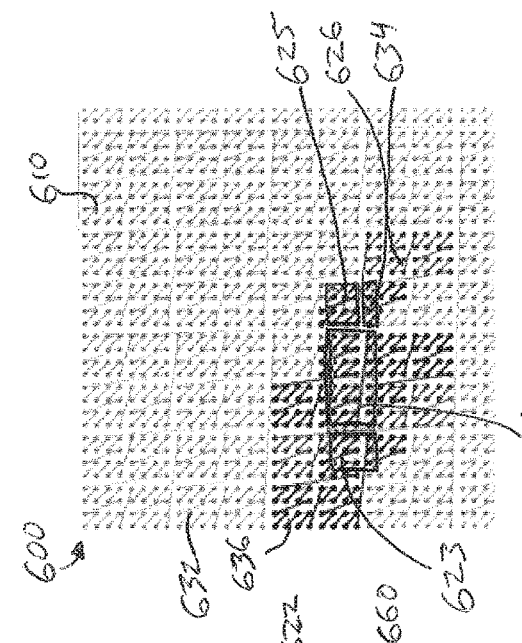

The process continues in FIG. 6E, which shows the independent splitting of the two search boxes 621 and 622 along their major bit boundaries. As such, search box 621 is split by line 650 and search box 622 is split by line 660. The result is shown in FIG. 6F, with search box 621 being split by line 650 into search boxes 623 and 624, and search box 622 being split by line 660 into search boxes 625 and 626. Also shown in FIG. 6F is the further-reduced index runs 636, which are highlighted in the heavy-shaded overlay.

The process of splitting the search boxes can be continued until there are no points exterior to the desired search box, i.e. no false alarms. Note that all points below and to the left of the lower bound and all points above and to the right of the upper bound of the search box are excluded from the excursion space.

It is straightforward to apply MDI to range spaces in one or more dimensions. The search boxes are well-defined, but have range limits that are either the minimum or maximum values in the data set. Although it is easy to keep track of these values on the fly, this means that on average, the search boxes will encompass half of the data set. The index runs will be significant, even with multiple splittings. Extracting a large fraction of a data store does not scale well to big data. This is not an unexpected result as even the exact answer will span a large fraction of the data set in the case of evenly distributed starts and ends.

However, in many realistic cases, the data will not be evenly distributed in the allowed range space. Average extents that are small compared to the scale of the dimension are typical. Consider, for example, tract-housing plot sizes compared to city or state scales, or the duration of an appointment compared to the length of the appointment book. It is not unreasonable then to model the ranges as an arbitrary start point within the scale, but with extents that are Gaussian distributed with a σ less than, and perhaps significantly less than, the size scale of the data. The range plots shown in FIGS. 2, 3, and 5 have shaded to indicate such a distribution.

This situation can be exploited using approximate search boxes that are significantly smaller than the exact solution yielding MDI searches with much better performance. The tradeoff is that this is not an exact solution; some overlapping ranges will be missed. Decreasing the search-box size reduces the number of false positives coming from the index-run excursions, but at the cost of a higher number of missed solutions. This is a theme familiar to those versed in detection theory, and we will couch our performance results in terms of probability of detection, $P_D$, versus the probability of a false alarm, $P_{FA}$.

Figure 7:
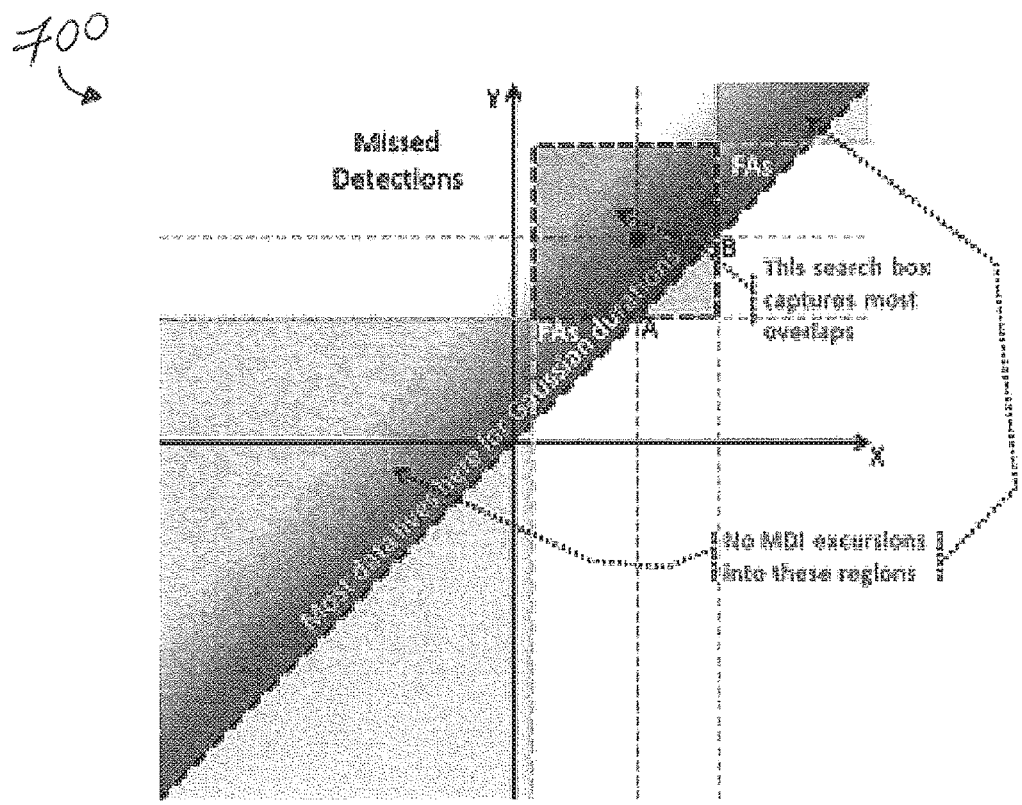
FIG. 7 shows a diagram illustrating the location of one-dimensional ranges with Gaussian-duration approximation.

Diagram 700 shown in FIG. 7 illustrates the search-box approximation and the capture of most of the desired overlaps. The search box has a lower limit at [A-$f_s\sigma$, A] and upper limit [B, B+$f_s\sigma$], where $f_s$ is a search-box size parameter. Typically, the missed detections will be those overlapping the test point or range near the edge of the extents. Less likely are the cases where the stored extents are fairly large. In the latter case, if important to a problem, these would generally be few enough to handle in a separate table. The false alarms (FA) can only exist in two, much-smaller triangular regions.

In the world of distributed big data, Hadoop and Map/Reduce are the paradigms-du-jour. In the Hadoop Distributed File System (HDFS), data is distributed over many nodes and replicated for robustness. The driving factor in the efficiency of the Hadoop system is the cost of seek times versus read times for physical-disk drives. Dumping a large block of the disk store into memory and filtering there with map/reduce functions is faster than directly accessing the data with numerous disk seeks.

Databases built on top of HDFS are generally non-relational, using some form of a key-value store. These NoSQL stores eschew typical database normalizations to take advantage of Hadoop's efficiencies by distribution; replicating data stored directly with the key, as opposed to pointing to another table and hence having another disk seek. One such database is Apache Accumulo, originally built by NSA along the lines of Google's Big Table, but with row-level access controls. Accumulo distributes the data roughly along the lines of an ASCII sort of the key. This allows for Hadoop-efficient retrieves with map/reduce filtering.

As an example, Accumulo will be used as the database model for discussion purposes. Data is stored into the database using a multidimensional range index as the key—that is, the row-id part of the key. When a search is required, the approximate search box described previously is used. Search box splitting is also performed to reduce the false alarms.

However, there is a cost associated with reducing the false-alarm rate by splitting. Each search run corresponds to requesting a seek in the Hadoop store, and each seek results in a data dump of some size, $S_{Hadoop}$, typically 64 MB. This data is processed by map/reduce to extract the desired data. At some level of splitting, this becomes more expensive than just filtering the data with false alarms using map/reduce. A simplistic way to determine the optimal splitting is to look for the break-even point of data dumped. Ignoring issues such as the data density as a function of index and how many Hadoop seeks are required for long index runs, the splitting criteria is given by Equation 1:

$$P_{FA} N_{Records} S_{Record} \geq n_{splits} S_{Hadoop} \qquad \text{(Eq. 1)}$$

Here the number of records due to false alarms is the probability of a false alarm, $P_{FA}$, times the number of records in the database, $N_{Records}$. The size of the false-alarm data depends on the average size of a record, $S_{Record}$. So long as this is greater than the data dump due to $n_{splits}$ search boxes, the search box may be split some more. Rearranging, the optimization criteria found is given in Equation 2:

$$\frac{n_{splits}}{P_{FA}} \leq \frac{N_{Records} S_{Record}}{S_{Hadoop}} = \frac{S_{Database}}{S_{Hadoop}} \qquad \text{(Eq. 2)}$$

Noting that $P_{FA}$ is a function of the number of splits, there is a fairly non-linear optimization equation. The limiting parameter is the number of Hadoop-seek dumps it takes to dump the full database. For a 1 TB database this number is 16K, assuming a typical $S_{Hadoop}$. So for high false-alarm rates, the search boxes need to be split many times to minimize dumping a large fraction of the database. While on the other hand, low false-alarm rates would need just a few levels of splits to reach a Hadoop-optimal search.

Figure 8:
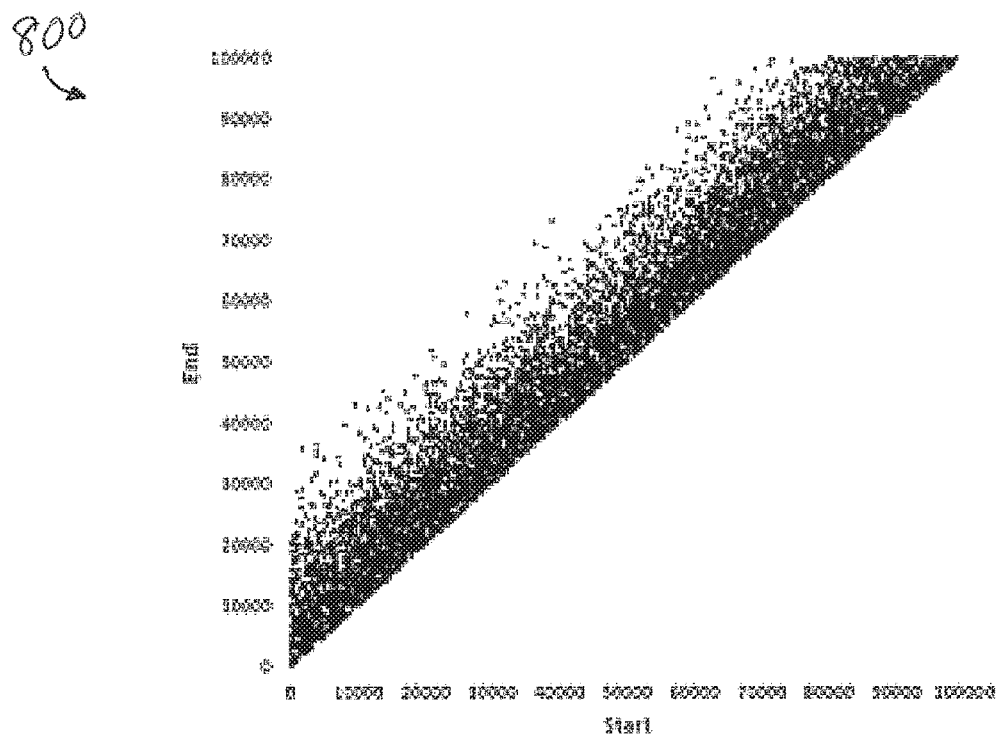
FIG. 8 shows a graph illustrating an instance of a one-dimensional range Gaussian-distributed with a standard deviation of 0.1 times the scale of the dataset.

To quantify this result, a number of simulations were run and analyzed. One-, two-, and three-dimensional overlaps were considered, corresponding to two-, four-, and six-dimensional range indexes. For each overlap case, three Gaussian-duration parameters were used: $\sigma$/Scale=0.01, 0.03, and 0.1. Each start and end point is chosen to be an integer between 0 and Scale=100,000. For the higher-dimensional overlap cases, the same $\sigma$ was used for all dimensions. Graph 800 shown in FIG. 8 shows an instance of a one-dimensional case with $\sigma$/Scale=0.01 and 10,000 ranges.

The actual instances of the overlap-range sets used for the results consisted of 100,000 points and eight separate instances were generated for each case. Hence, the sample space supporting the results is 800,000. Against each of these instances, a set of eight random test ranges was also generated. For each of these test ranges an exact solution of overlapped ranges from the simulated range-set instance by a brute-force method. Then the solution from the approximate multidimensional-overlap-index method was computed using search-box sizes of 1.4$\sigma$, 2.1$\sigma$, 2.5$\sigma$, 2.8$\sigma$, and 3.5$\sigma$. From each of these, the number of missed overlaps and the number of false alarms were tallied.

One way of analyzing and displaying performance of detection results is with a receiver-operating-characteristics (ROC) curve. The probability of detection, $P_D$, is plotted versus the probability of false alarm, $P_{FA}$. Performance is better the further the curve is to the upper left, that is, higher $P_D$ and lower $P_{FA}$.

As expected, increasing the search-box size reduced the number of missed detections and increased the number of false alarms. For all of these cases, the $P_D$ was over 0.9, and for most it was over 0.99. The latter corresponds to search-box sizes of 2.1$\sigma$ and larger. The $P_{FA}$ varied from 0.0003 to 0.12. The results shown correspond to choosing the optimal splitting level as discussed previously.

Figure 9:
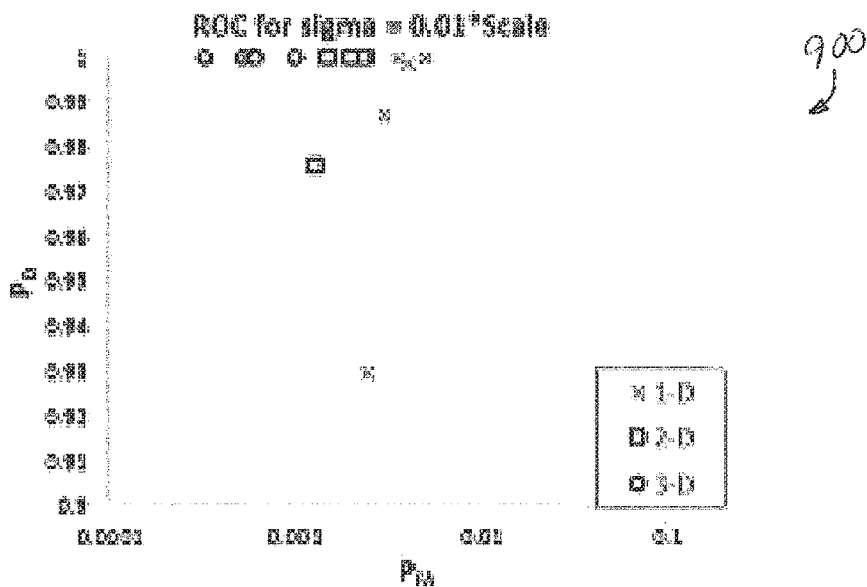
FIG. 9 shows a graph illustrating the performance of multi-dimensional overlap indexing for one-, two-, and three-dimensional overlaps and a standard deviation of 0.01 times the scale of the dataset.
Figure 10:
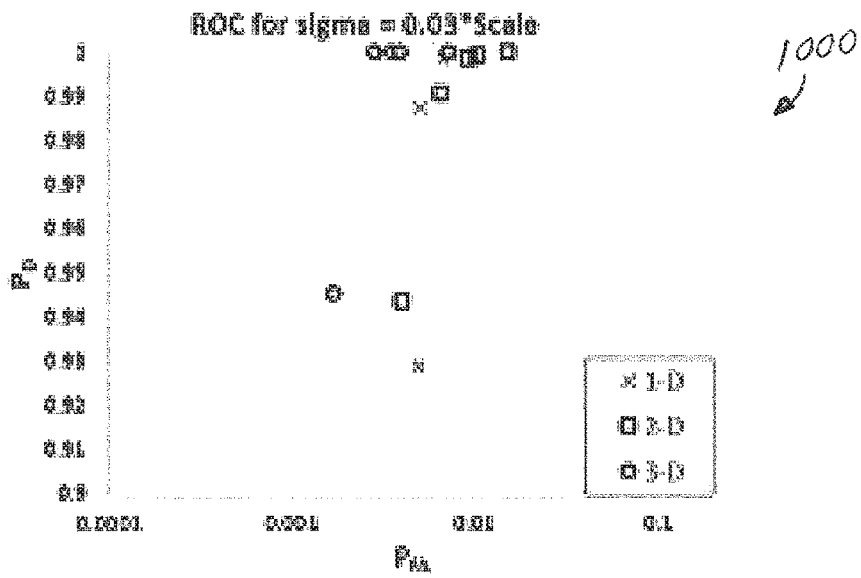
FIG. 10 shows a graph illustrating the performance of multi-dimensional overlap indexing for one-, two-, and three-dimensional overlaps and a standard deviation of 0.03 times the scale of the dataset.
Figure 11:
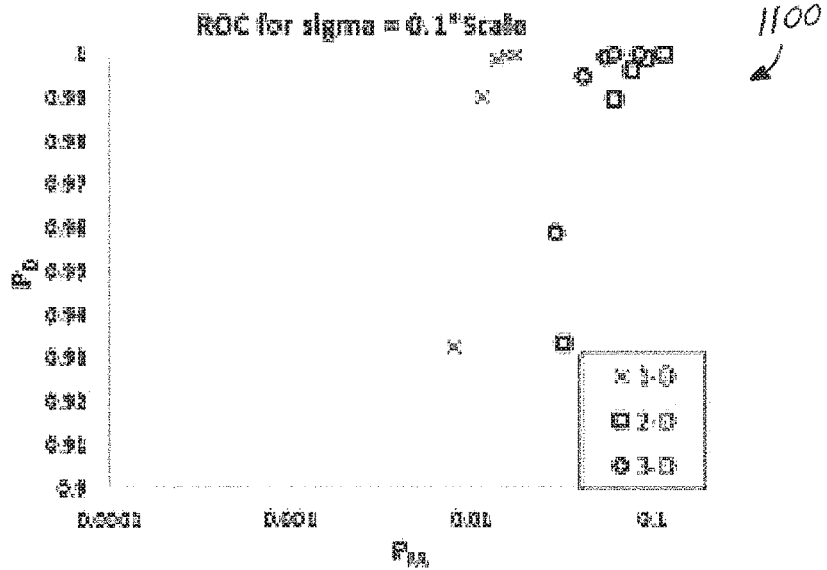
FIG. 11 shows a graph illustrating the performance of multi-dimensional overlap indexing for one-, two-, and three-dimensional overlaps and a standard deviation of 0.1 times the scale of the dataset.

FIGS. 9-11 show the results. FIG. 9 shows a graph 900 illustrating the performance of multi-dimensional overlap indexing for one-, two-, and three-dimensional overlaps and a standard deviation of 0.01 times the scale of the dataset, FIG. 10 shows a graph 1000 illustrating the same for a standard deviation of 0.03 times the scale of the dataset, and FIG. 11 shows a graph 1100 illustrating the same for a standard deviation of 0.1 times the scale of the dataset.

Also as expected, as the spread of the extents increases, the performance of the searches degrades. This is seen with the curves sliding to higher $P_{FA}$s going from FIG. 9 to FIG. 10 to FIG. 11. The dramatically high $P_{FA}$s occur for the largest search boxes (3.5$\sigma$) when $\sigma$=0.1*scale. That is, the search box is over a third of the scale. As can be seen from FIGS. 9-11, for the smallest relative $\sigma$(=0.01*scale), the performance improves with increasing dimension. The trend is seen starting to reverse at $\sigma$=0.03*scale, but the three-dimensional results are still the best.

Figure 12:
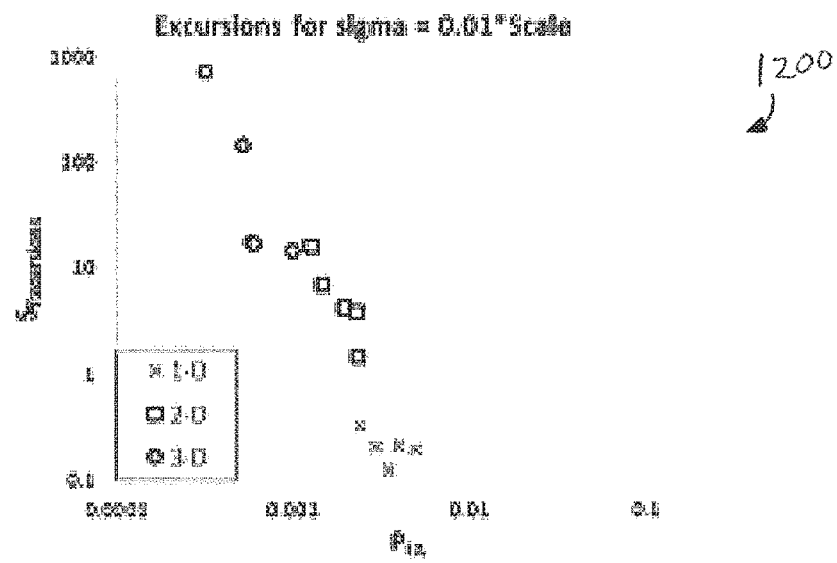
FIG. 12 shows a graph illustrating the relative excursion size versus probability of false alarm for one-, two-, and three-dimensional overlaps and a standard deviation of 0.01 times the scale of the dataset.
Figure 13:
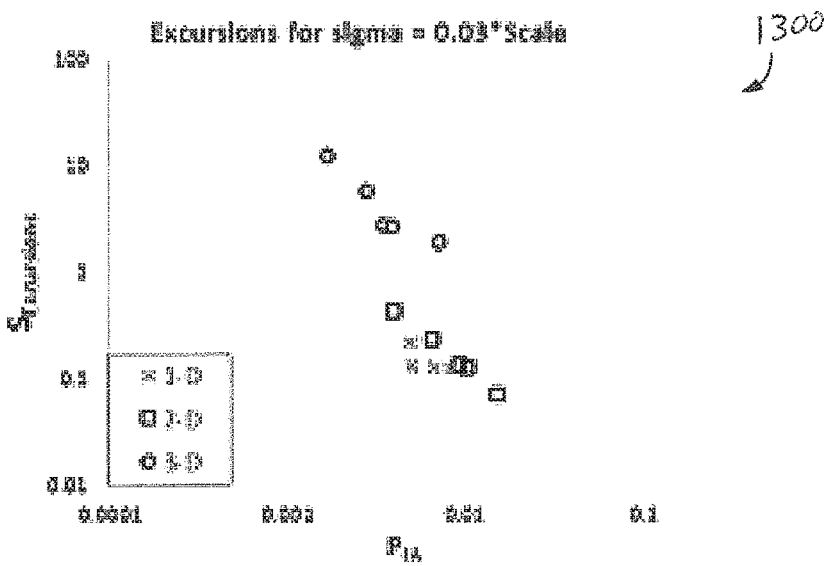
FIG. 13 shows a graph illustrating the relative excursion size versus probability of false alarm for one-, two-, and three-dimensional overlaps and a standard deviation of 0.03 times the scale of the dataset.
Figure 14:
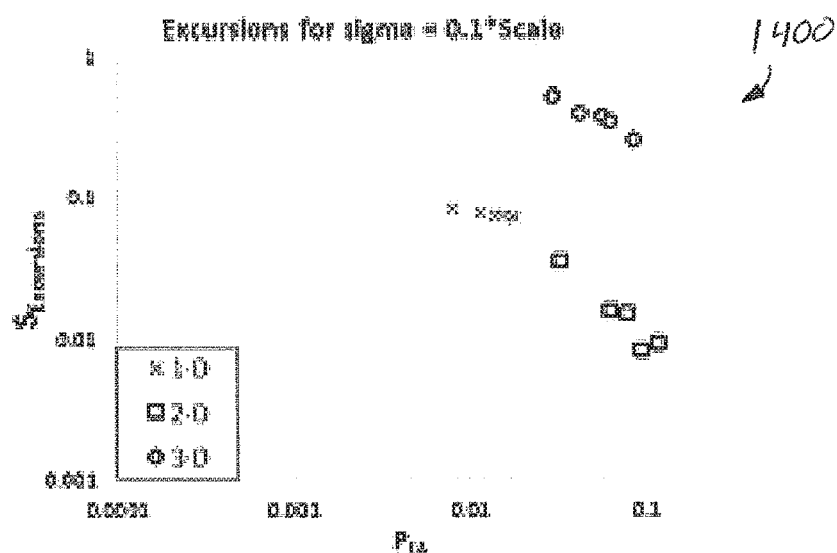
FIG. 14 shows a graph illustrating the relative excursion size versus probability of false alarm for one-, two-, and three-dimensional overlaps and a standard deviation of 0.1 times the scale of the dataset.

One parameter in the performance is the size of the excursions of the index run outside of the search box. This is directly related to the $P_{FA}$ and should be increasing with increasing dimension. To examine this, an excursion parameter, $S_{Excursions}$=(length of index run/size of search box)−1, is calculated, giving the relative size of the excursions. FIGS. 12-14 show this plotted against the $P_{FA}$ for the cases shown above. FIG. 12 shows a graph 1200 illustrating the relative excursion size versus probability of false alarm for one-, two-, and three-dimensional overlaps and a standard deviation of 0.01 times the scale of the dataset, FIG. 13 shows a graph 1300 illustrating the same for a standard deviation of 0.03 times the scale of the dataset, and FIG. 14 shows a graph 1400 illustrating the same for a standard deviation of 0.1 times the scale of the dataset. As can be seen from the graphs in FIGS. 12-14, the excursions do indeed get significantly larger with increasing dimension in all cases. The increase of the excursions is somewhat exaggerated by the fact that fewer splits were performed on the higher dimensions because of the lower $P_{FA}$s.

So, the performance improves despite the increasing excursion sizes for the smallest relative σ. This means that the excursions are encountering a lower population in the excursion region. Although the excursion region is increasing on the order of $2^m$ with dimension, m, the probability of finding an object there is decreasing much faster for the tight distribution.

Figure 15:
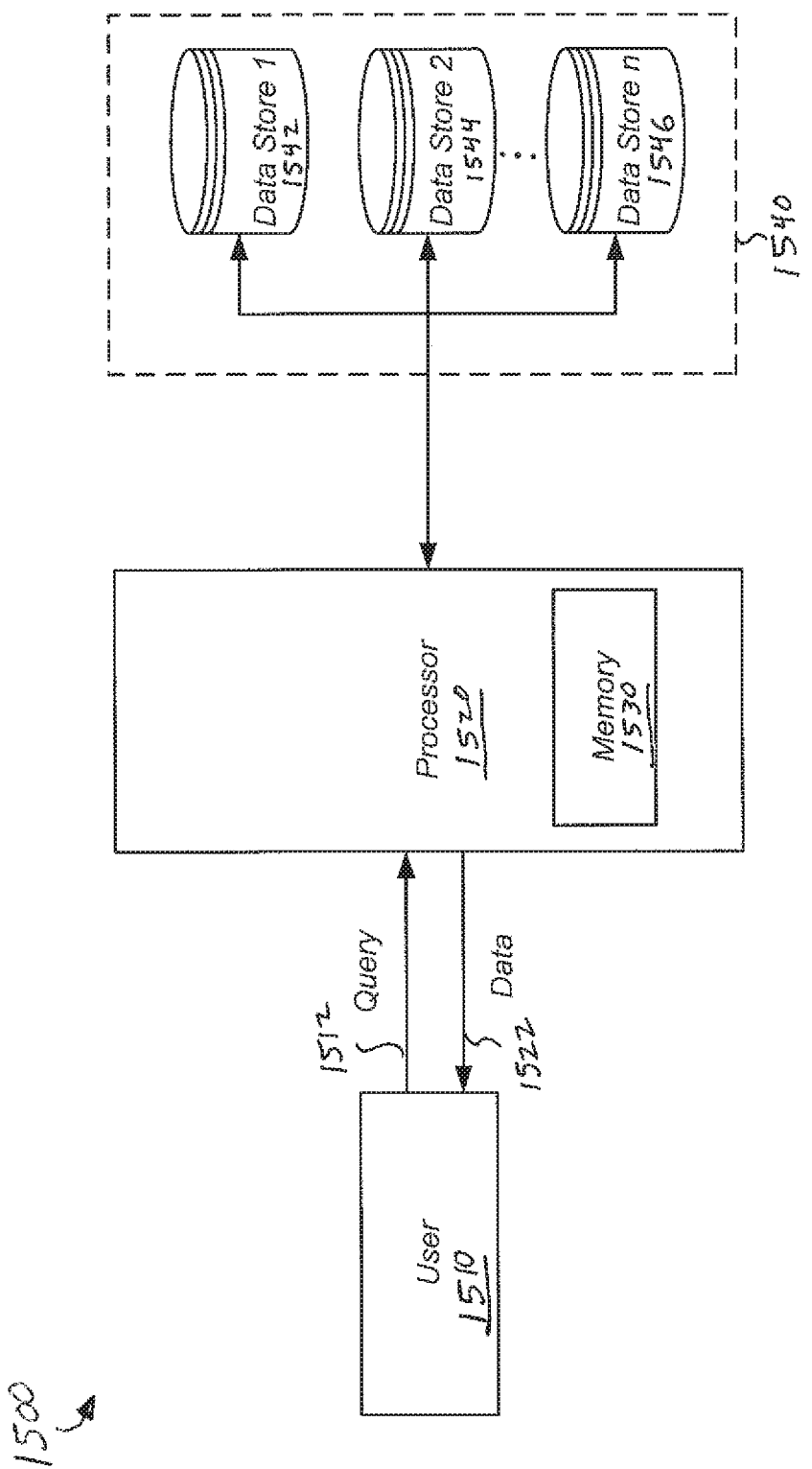
FIG. 15 shows a diagram illustrating an embodiment of a system that may be used to perform the embodiments of the methods disclosed herein.

FIG. 15 shows a diagram 1500 illustrating an embodiment of a system that may be used to perform the embodiments of the methods disclosed herein. System 1500 includes a user 1510, who sends a query 1512 for data to a processor 1520. As an example, user 1510 may be a human user sending a query via a computer, laptop, mobile device, etc . . . , or an automated system that is specifically configured via the appropriate software to send a query. Any such electronic device being used by user 1510 to send a query may be connected to processor 1520 via a wired or wireless connection, such as via a network or the Internet.

Processor 1520 may contain memory 1530 therein. Processor 1520 contains the appropriate computer readable programming code therein, such as within memory 1530, to perform the various steps of method 1600 shown in FIG. 16 and discussed with reference thereto. As an example, processor 1520 may be a computer, laptop, mobile device, or any other powered electronic device configured to receive input from a user 1512 and electronically communicate with a data storage such as data storage 1540 to retrieve requested data.

Processor 1520 is configured via the appropriate software to communicate with data storage 1540, which contains data store 1 1542, data store 2 1544, to data store n 1546, where n is any positive integer greater than 2, to retrieve the requested data. In some embodiments, data storage 1540 is a distributed data storage network comprising a plurality of data storage nodes, such as nodes 1542, 1544 and 1546, wherein a multi-dimensional dataset comprising a plurality of data objects is spread out over more than one of the plurality of data storage nodes 1542, 1544, and 1546. Data storage 1540 may be located within the same system as processor 1520 or may be operatively connected to processor 1520 via a wired or wireless connection, such as part of a network. As an example, data storage 1540 may reside in a cloud-based architecture, with the data stores being nodes wired or wirelessly distributed amongst one or more various different locations within the cloud-based architecture. Further, data of any type may be stored within data storage 1540, including alphanumeric, image, and video data, with such data being searchable as discussed herein and able to be returned to a user via a data query.

Processor 1520 retrieves the requested data from any number of the data stores within data storage 1540 and then provides the data 1522 to the user 1510. As an example, if user 1510 sends the query using a computer, laptop, or mobile device, data 1522 received from processor 1520 may be displayed to user 1510 on a screen of such electronic device.

Figure 16:
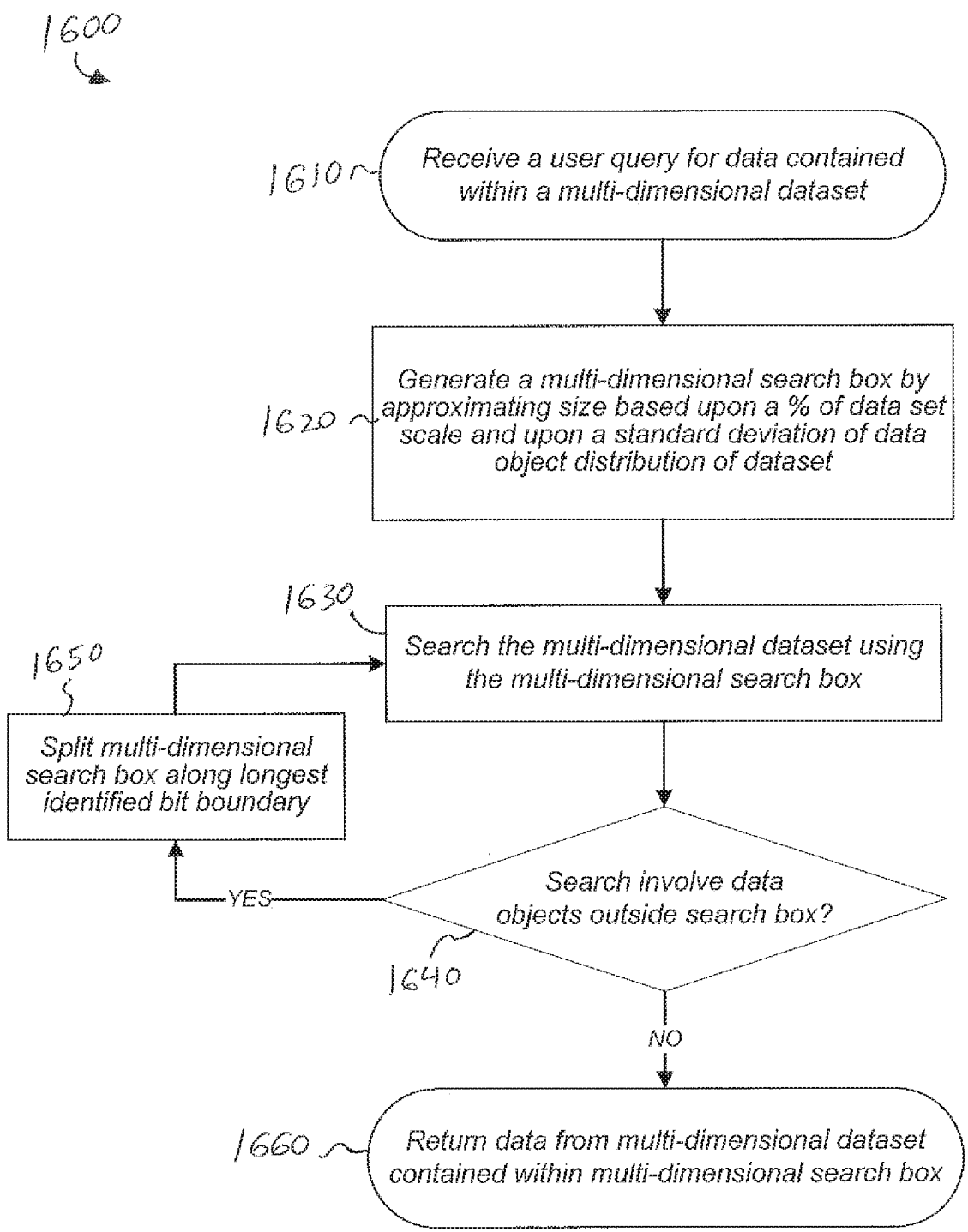
FIG. 16 shows a flowchart of an embodiment of a method for multi-dimensional range-index searching using search box approximation and splitting.

FIG. 16 shows a flowchart of an embodiment of a method 1600 for multi-dimensional range-index searching using search box approximation and splitting. As an example, method 1600 may be performed by system 1500 as shown in FIG. 15. Also, while FIG. 16 shows one embodiment of method 1600 to include steps 1610-1660, other embodiments of method 1600 may contain fewer or more steps. Further, while in some embodiments the steps of method 1600 may be performed as shown in FIG. 16, in other embodiments the steps may be performed in a different order, or certain steps may occur simultaneously with one or more other steps.

Method 1600 may begin with step 1610, which involves receiving, from a user 1510, a user query 1512 for data contained within a multi-dimensional dataset comprising a plurality of data objects. In some embodiments, the user query 1512 for data comprises a user query for overlaps of data objects within the multi-dimensional dataset and a user-selected value. As an example, the user-selected value is a range of values. In some embodiments, the data objects are stored within the multi-dimensional data set using a multi-dimensional range index as a key. As an example, the multi-dimensional dataset is indexed using a space-filling curve. In some embodiments, the data objects are spread out over more than one of a plurality of data storage nodes of a distributed data storage network, such as shown in FIG. 15. In some embodiments, the user 1510 is a human, while in other embodiments, user 1510 may be an automated system, comprising hardware, software, or a combination of both, that is configured to request and retrieve data.

Step 1620 involves generating a multi-dimensional search box for use in searching the multi-dimensional dataset according to the user query. In some embodiments, the size of the multi-dimensional search box is approximated based upon a percentage of the scale of the dataset and upon the standard deviation of the data object distribution of the dataset. In embodiments where the user query 1512 for data comprises a user query for overlaps of data objects within the multi-dimensional dataset and a user-selected value, where the user-selected value is a range of values, step 1620 includes the step of modeling the range of values as an arbitrary start point within the multi-dimensional data set with extents that are Gaussian distributed with a standard deviation less than the scale of the data set.

Step 1630 involves searching the multi-dimensional dataset using the multi-dimensional search box. Step 1640 involves a determination as to whether or not the search involved data objects outside of the search box. If so, step 1650 involves splitting the multi-dimensional search box along the longest identified bit boundary. In some embodiments, step 1650 involves iteratively splitting the multi-dimensional search box along a longest identified bit boundary until the step of searching the multi-dimensional dataset using the multi-dimensional search box only encompasses a search of data objects within the multi-dimensional search box. In some embodiments, step 1650 involves iteratively splitting the multi-dimensional search box along a longest identified bit boundary so long as $P_{FA}N_{objects}S_{Object} \geq n_{splits}S_{Data}$, wherein $P_{FA}$ is a probability of a false alarm, $N_{objects}$ is the number of data objects in the multi-dimensional dataset, $S_{Object}$ is the average size of a data object, $n_{splits}$ is the current number of splits of the multi-dimensional search box, and $S_{Data}$ is the average size of a data dump given the structure of the multi-dimensional dataset.

If, at step 1640, the search does not involve data objects outside of the search box, step 1660 involves returning data to the user from the multi-dimensional dataset contained within the multi-dimensional search box.

Method 1600 may be implemented as a series of modules, either functioning alone or in concert, with physical electronic and computer hardware devices. Method 1600 may be computer-implemented as a program product comprising a plurality of such modules, which may be displayed for a user.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the disclosed embodiments are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

I claim:

1. A method comprising the steps of:
receiving, from a user, a user query for data contained within a multi-dimensional dataset comprising a plurality of data objects, wherein the query for data comprises a user query for overlaps of data objects within the multi-dimensional dataset and a user-selected value wherein the user-selected value is a range of values;

generating a multi-dimensional search box for use in searching the multi-dimensional dataset according to the user query, wherein the size of the multi-dimensional search box is approximated based upon a percentage of the scale of the dataset and upon the standard deviation of the data object distribution of the dataset, wherein the multi-dimensional search box is generated in part by modeling the range of values as an arbitrary start point within the multi-dimensional dataset with extents that are Gaussian distributed with a standard deviation less than the scale of the dataset;

searching data from the multi-dimensional dataset using the multi-dimensional search box;

iteratively splitting the multi-dimensional search box along a longest identified bit boundary so long as $P_{FA}N_{objects}S_{object} \geq n_{splits}S_{Data}$, wherein $P_{FA}$ is a probability of a false alarm, $N_{objects}$ is the number of data objects in the multi-dimensional dataset, $S_{object}$ is the average size of a data object, $n_{splits}$ is the current number of splits of the multi-dimensional search box, and $S_{Data}$ is the average size of a data dump given the structure of the multi-dimensional dataset; and returning, to the user, data from the multi-dimensional dataset contained within the multi-dimensional search box.

2. A system comprising:
a distributed data storage network comprising a plurality of data storage nodes, wherein a multi-dimensional dataset comprising a plurality of data objects is spread out over more than one of the plurality of data storage nodes;

a processor operatively connected to the distributed data storage network, the processor configured to:
receive, from a user, a user query for data contained within a multi-dimensional dataset, wherein the query for data comprises a user query for overlaps of data objects within the multi-dimensional dataset and a user-selected value wherein the user-selected value is a range of values;

generate a multi-dimensional search box for use in searching the multi-dimensional dataset according to the user query, wherein the size of the multi-dimensional search box is approximated based upon a percentage of the scale of the dataset and upon the standard deviation of the data object distribution of the dataset, wherein the multi-dimensional search box is generated in part by modeling the range of values as an arbitrary start point within the multi-dimensional data set with extents that are Gaussian distributed with a standard deviation less than the scale of the dataset;

search data from the multi-dimensional dataset using the multi-dimensional search box, wherein the processor is further configured to iteratively splitting the multi-dimensional search box along a longest identified bit boundary so long as $P_{FA}N_{objects} \geq S_{object} \geq n_{splits}S_{Data}$, wherein $P_{FA}$ is a probability of a false alarm, $N_{objects}$ is the number of data objects in the multi-dimensional dataset, $S_{object}$ is the average size of a data object, $n_{splits}$ is the current number of splits of the multi-dimensional search box, and $S_{Data}$ is the average size of a data dump given the structure of the multi dimensional dataset; and return, to the user, data from the multi-dimensional dataset contained within the multi-dimensional search box.

* * * * *